United States Patent [19]

Kucera

[11] Patent Number: 4,576,356

[45] Date of Patent: Mar. 18, 1986

[54] PIPE-VIBRATION REDUCER

[76] Inventor: Richard J. Kucera, 3861 Balsa St., Irvine, Calif. 92714

[21] Appl. No.: 665,564

[22] Filed: Oct. 26, 1984

Related U.S. Application Data

[63] Continuation-in-part of Ser. No. 444,540, Feb. 3, 1983, abandoned.

[51] Int. Cl.⁴ ............................................. F16M 13/00
[52] U.S. Cl. ...................................... 248/559; 248/610; 248/62; 188/380
[58] Field of Search ................. 248/559, 610, 612, 60, 248/62; 188/380; 267/136, 137; 138/107

[56] References Cited

U.S. PATENT DOCUMENTS

| | | | |
|---|---|---|---|
| 1,995,620 | 3/1935 | Monroe | 174/42 |
| 2,132,319 | 10/1938 | Preiswerk | 174/42 |
| 2,494,358 | 1/1950 | Rostoker | 188/380 X |
| 3,259,212 | 7/1966 | Nishioka et al. | 174/42 X |
| 3,664,620 | 5/1972 | Branum | 248/63 |
| 4,494,634 | 1/1985 | Kato | 188/380 |

Primary Examiner—Ramon S. Britts
Assistant Examiner—David M. Purol
Attorney, Agent, or Firm—Francis X. LoJacono

[57] ABSTRACT

This invention relates to a pipe-vibration reducer device arranged to be fixedly mounted at any desired radial position about a pipe, so as to reduce abnormal or resonant pipe vibrations to acceptable levels by having its natural frequency tuned to the frequency of the vibrating pipe. The device includes a mounting bracket defined by first and second clamp members, a dynamic mass being supported in a pair of carriage members which are slidably supported by compression springs within guide-bar members secured to the first clamp member.

9 Claims, 3 Drawing Figures

PIPE-VIBRATION REDUCER

CROSS-REFERENCE TO RELATED APPLICATION

This is a continuation-in-part of application Ser. No. 444,540 filed Feb. 3, 1983, which is being abandoned.

BACKGROUND OF THE INVENTION

1. Field of the Invention

This invention relates generally to a vibration reducer and/or dampener device, and more particularly to a vibration reducer and dampener in combination with pipes used for gas or liquid.

2. Description of the Prior Art

Problems and difficulties are being encountered in providing suitable means for reducing and/or dampening vibrations along the longitudinal lengths of strings of pipes.

Various types of vibrational dampening devices are known, but these are generally applied to transmission-line cables and like structures. As examples of these types of devices, one may refer to U.S. Pat. Nos. 1,995,620; 2,132,319; 3,614,291 and 3,664,620.

U.S. Pat. No. 4,203,546 discloses an oscillation dampening system for railway tracks.

The above-mentioned patents have features that restrict their use, and are generally not compatible with pipe structures associated with the present invention.

BRIEF SUMMARY OF THE INVENTION

The present invention has for an important object to provide a pipe-vibration reducer and/or dampener that reduces abnormal or resonant pipe vibration to acceptable levels by having its natural frequency tuned to the frequency of the vibrating pipe. After the reducer is tuned to the pipe's vibration, the pipe will become essentially motionless.

It is an another object of the present invention to provide a vibration reducer for liquid and gas pipe systems, wherein the reducer includes a mounting bracket for attachment to a pipe, the bracket being arranged to support a floating mass by means of a pair of springs. Once the values of the mass and the spring members are determined, the reducer can be readily tuned from vibration measurements, so as to provide the necessary frequency-tuned, one-dimensional motion of the reducer with respect to the pipe.

Still another object of the invention is to provide an apparatus of this character that is arranged to be directly clamped to a pipe without any other means of support, thus establishing a reducer that is essentially supportless with respect to the main supporting structures of the pipe.

It is still another object of the invention to provide a vibration reducer for pipes wherein the dynamic mass is supported at its opposite ends by carriage members which are slidably mounted between support bars by means of anti-friction bearings, and held in place by spring members which are interposed between the floating mass and the mounting bracket, so as to freely transmit vibration into the dynamic mass.

A further object of the invention is to provide a device of this character that is readily tunable to the frequency of the vibrating pipe.

A still further object of the present invention is to provide a device of this character that establishes a nearly frictionless motion for the vibrating mass and spring combination.

It is still a further object of the invention to provide a pipe-vibration reducer that includes relatively few operating parts, and is easy to service and maintain.

Still another object of the present invention is to provide a pipe-vibration reducer that is relatively inexpensive to manufacture and can be conveniently located on a string of pipes, thus eliminating expensive pipe-support devices for dynamic loads such as earthquakes, water-hammers and pump vibrations.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

DESCRIPTION OF THE DRAWINGS

Referring more particularly to the accompanying drawings, which are for illustrative purposes only.

DESCRIPTION OF THE PREFERRED EMBODIMENT

Figure 1:
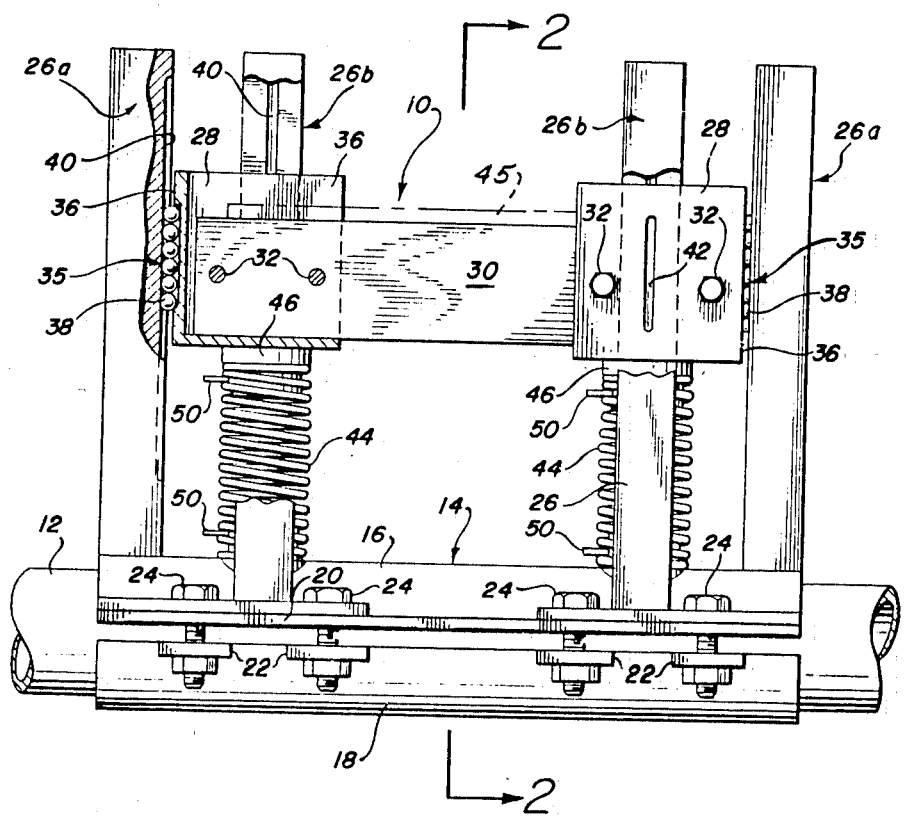
FIG. 1 is a side-elevational view of the present invention with portions thereof broken away to illustrate various components of the pipe-vibration reducer as it is mounted to a typical pipe.
Figure 2:
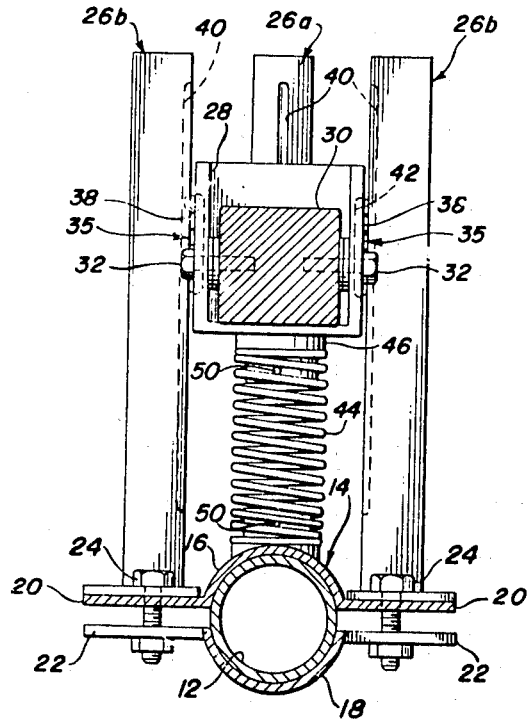
FIG. 2 is a cross-sectional view taken substantially along line 2—2 of FIG. 1.

Referring to FIGS. 1 and 2, there is shown a pipe-vibration reducer device, generally indicated at 10, which is arranged so as to be fixedly mounted to a typical pipe 12. It should be noted first that the present invention is required to be adapted to correspond to the various pipe diameters. Accordingly, the pipe-vibration reducer comprises a mounting means, designated at 14, which is defined by a pipe bracket formed by a first longitudinal clamp member 16 and a second longitudinal clamp member 18. The first clamp member 16 includes a semicircular body having side-extended flanges 20. The second clamp member 18 also includes a semicircular body having side-extended flanges 22. In order to mount the device to a pipe, the two clamp members 16 and 18 are positioned about pipe 12 and are clamped into a suitable fixed position by bolts 24, which are secured to flanges 20 and 22 as shown. It is important to note that pipe-vibration reducer 10 may be positioned at any suitable radial angle, the preferred position being vertical, as shown.

Fixedly mounted to the first clamp member 16 is a means to guide the dynamic mass 30. Preferably, the guide means will be comprised of two groups of three guide-bar members 26, each group being located adjacent the opposite ends of first clamp member 16. Thus, the guide bars are arranged to slidably receive carriage members 28 defined as open-end boxes in which the opposite ends of the dynamic mass (preferably a steel bar) are secured and supported in the respective carriage members 28, as illustrated in FIG. 1. Mass 30 is secured to the carriage members by bolts 32.

The three guide bars 26 of each group are so positioned that there is an end bar 26a and oppositely disposed side bars 26b, so that the respective carriage members can freely oscillate longitudinally along the guide bars without restriction. This, in turn, allows mass 30 to oscillate so as to absorb the transferred vibration of pipe 12.

Moreover, in order to establish an anti-frictional, free-floating movement for carriages 28 and mass 30, there is provided a bearing means (generally indicated at 35) interposed between the walls 36 of carriage members 28 and guide bars 26. It is contemplated that various types of bearing means may be suitably employed, but for illustrative purposes ball bearings 38 are shown positioned within grooves 40 of bars 26 and grooves 42 in carriage walls 36.

Interposed between the bottom of each carriage member 28 and the first clamp member is a resilient support means defined by a pair of coil-compression springs 44. The upper end of each compression spring 44 is secured to the underside of the respective carriage members 28. As illustrated in FIGS. 1 and 2, one end of the spring is mounted to a depending boss member 46 formed on the bottom wall of each carriage 28, the opposite end thereof being attached to a second boss member 48 formed on the first clamp member 16. The springs are affixed to each boss member by pins 50. However, other fastening means may be used, such as welding.

Since the springs 44 are interconnected to the carriages and their first clamp member, the pipe-vibration reducer device may be mounted at any radial position about pipe 12, as might be required.

Figure 3:
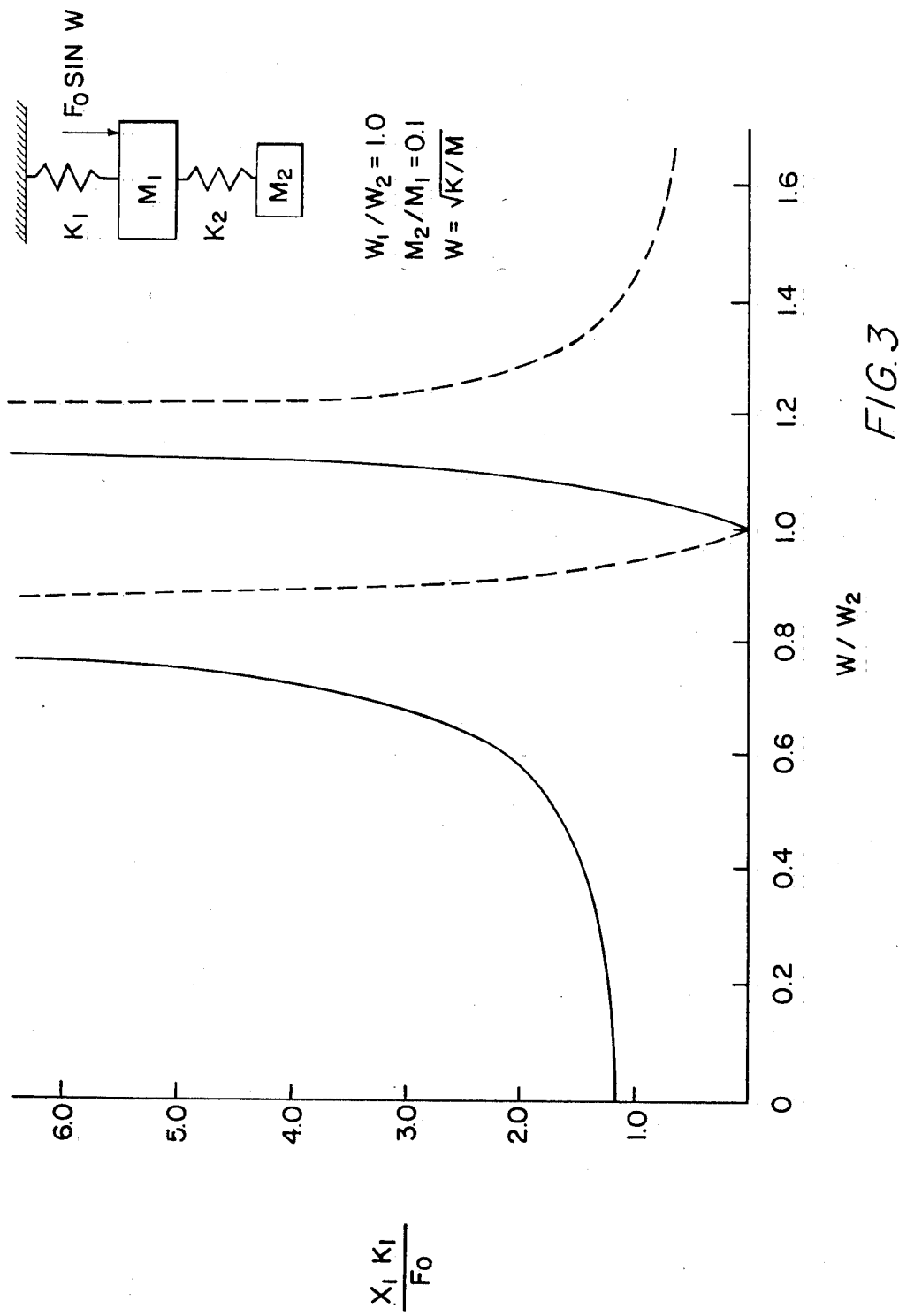
FIG. 3 is a graphical representation of the vibrational frequencies.

Hence, the pipe-vibration reducer 10, when mounted to pipe 12, will reduce abnormal or resonanct pipe vibration to acceptable levels by having its natural frequency tuned to the frequency of the vibrating pipe. In order to accomplish the tuning of the frequency, one or more tuning plates or bars 45 (shown in phantom lines in FIG. 1) may be mounted to mass 30. After the device 10 is properly tuned to the corresponding vibration of pipe 12, the pipe will become essentially motionless. Analytically, this is shown in FIG. 3.

The dimensionless deflection of a typical span of pipe $M_1$ is plotted against the ratio of the frequency of the vibrating-pipe span to the natural frequency of the pipe-vibration reducer $M_2$. The dashed curves in FIG. 3 are actually negative values, which are conveniently shown as positive values. Two typical resonance-deflection points for the two-dimensional dynamic system (pipe and vibration reducer) are shown at frequency ratios of 0.82 and 1.16. Also, the zero-deflection point is shown for the pipe span at a frequency ratio of 1.0. The zero-deflection point of the pipe span and the two resonance-deflection points for the pipe span and pipe-vibration reducer define the design requirements for the pipe-vibration reducer.

The nature of the pipe-vibration reducer is the combination of the mass (steel bar 30) and the stiffness of the resilient means (springs 44). The values for the mass and the stiffness are precisely determined from FIG. 3 or from vibration measurements, to provide the necessary frequency-tuned, one-dimensional motion of the pipe-vibration reducer with respect to the pipe. The pipe-vibration reducer 10 clamps directly to pipe 12 and requires no other means of support, which makes it essentially supportless with respect to the main supporting structures of the pipe (not shown). Nearly frictionless motion is provided between the mass 30 (steel bar) and its supporting structure by anti-friction ball bearings 38. This nearly frictionless motion is necessary to enable the mass the springs to move freely. The mass must be precisely balanced to prevent the bar from rocking on the two springs.

In order to more effectively reduce transient pipe vibrations such as from earthquakes and water hammers, and also steady-state vibrations, a combination of two or more pipe-vibration reducers may be installed on a single pipe or a piping system of headers and brackets. This increased effectiveness in reducing vibrations is achieved by tuning the pipe-vibration-reducer units to overlap resonance-frequency points of one unit with the zero-deflection frequency point of another unit—thus achieving a frequency band of zero deflection instead of a zero-deflection-frequency point, as shown in FIG. 3.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A frequency-tunable, vibration-reducer device for pipes and the like, comprising:

a mounting bracket defined by a first clamp member and a second clamp member, means for securing said first and second clamp members together wherein said clamp members are adapted to be fixedly secured to a pipe at any desired radial position thereon;

a dynamic mass freely mounted to said first clamp member;

guide means secured to and extending transversely of said first clamp member;

a pair of carriage members slidably received in said guide means, and supporting said dynamic mass within said guide means said entire dynamic mass being linearly moveable along with said carriage members in directions toward and away from said first clamp member;

bearing means interposed between said carriage members and said guide means, whereby said dynamic mass may move freely without restriction;

resilient means interposed between said carriage members and said first clamp member; and means for securing said resilient means to said carriage members and said first clamp member, whereby the resonant vibration of said pipe is directly transferred through said resilient means and into said dynamic mass, thus allowing said dynamic mass to be located radially outward from said pipe at a selective angular position relative to said pipe.

2. A frequency-tunable, vibration-reducer device as recited in claim 1, wherein said guide means comprises:

a first group of guide bars secured to one end of said first clamp member; and a second group of guide bars secured to the opposite end of said first clamp member, wherein each of said groups of guide bars are arranged to slidably receive said respective carriage members therebetween.

3. A vibration-reducer device as recited in claim 2, wherein said carriage members are each defined by an open-end box structure having an end wall and side walls, and a bottom wall open at its top and on one side, so as to receive the respective ends of said dynamic mass; and wherein said ends of said dynamic mass are attached to said respective carriage members.

4. A vibration-reducer device as recited in claim 3, wherein each of said guide-bar groups comprise three guide-bar members, one of said guide bars being positioned adjacent said end wall of said carriage and the remaining two guide bars being positioned adjacent said oppositely disposed side walls of said carriage members.

5. A vibration-reducer device as recited in claim 4, wherein said resilient means comprises a pair of compression springs, each of said springs having one end attached to said bottom wall of said carriage, the opposite end being attached to said first clamp member.

6. A vibration-reducer device as recited in claim 5, wherein each of said clamp members includes an elongated semicircular body member having laterally extended flange members, and fastening means adapted to be received in said flange members of said clamps.

7. A vibration-reducer device as recited in claim 4, wherein said dynamic mass is a metal bar.

8. A vibration-reducer device as recited in claim 4, including means for adjustably tuning the resonant vibration of said dynamic mass with respect to the frequency vibration of said pipe.

9. A vibration-reducer device as recited in claim 8, wherein said adjustable tuning means comprises one or more tuning plates mounted to said dynamic mass.

* * * * *